United States Patent Office 2,767,895
Patented Oct. 23, 1956

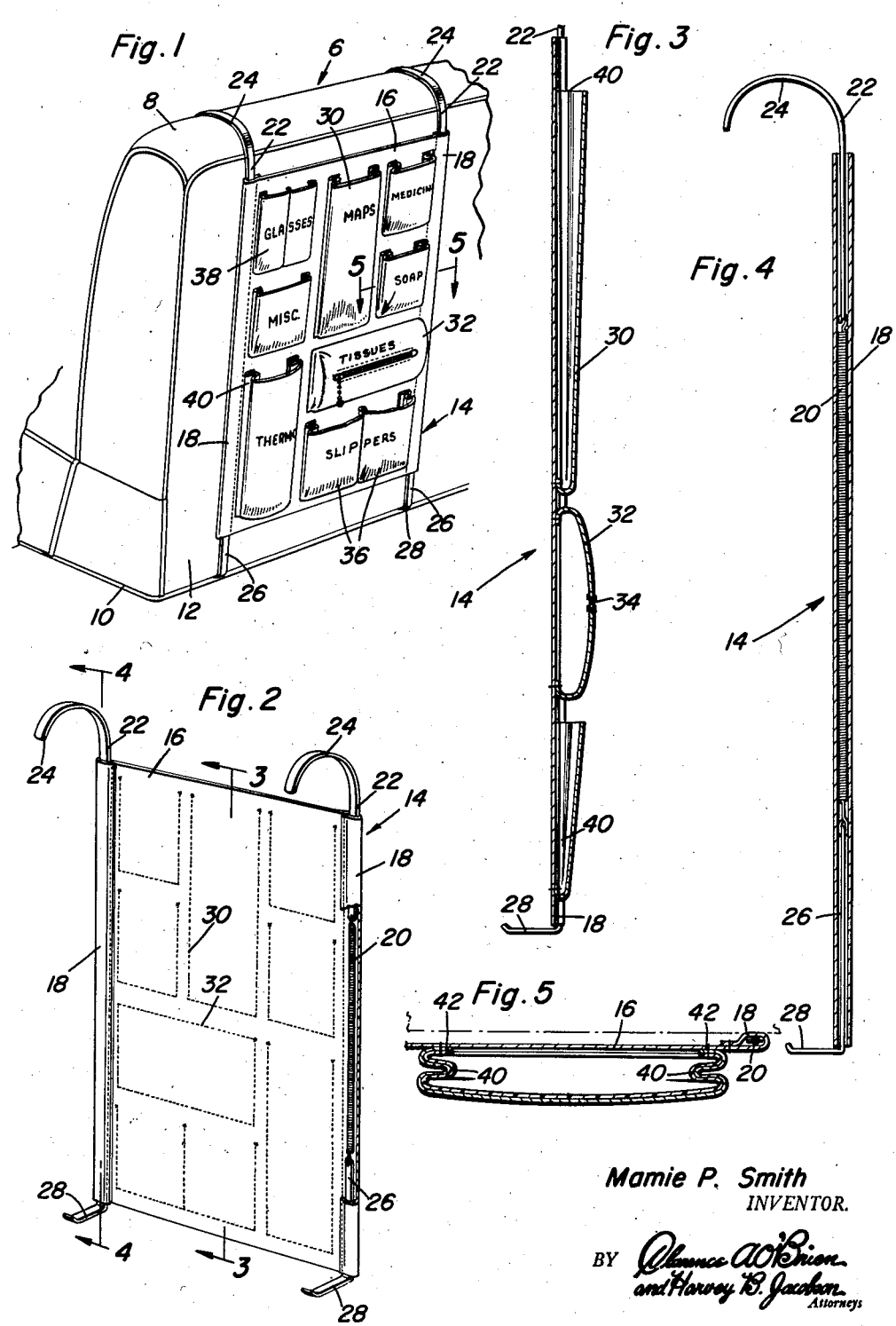

2,767,895

MULTIPURPOSE ATTACHMENT FOR VEHICLE SEAT

Mamie P. Smith, Homestead, Fla.

Application March 7, 1955, Serial No. 492,620

2 Claims. (Cl. 224—42.42)

The present invention relates to automotive appliances and accessories, generally classified, and has more particular reference to an automobile seat attachment such as is herein construed as a multipurpose utility device for handy and practical use by passengers of the automobile, especially when touring, traveling from one's home to a beach or elsewhere.

It is a matter of common knowledge that persons traveling distances in automobiles, especially when touring from place to place, hesitate to pack many small and miscellaneous items and articles in a suitcase. That is to say, medicines, shoes, thermos bottles, maps, tissues, and so on, may have to be used from time to time and in many instances they are allowed to be haphazardly strewn about in the car, much to the annoyance of passengers, especially when the over-all situation is perplexing, as is often the case. There has therefore long existed a need for a handy, practical and economical unitary accessory or device to facilitate ready-to-use storage of small, frequently used articles. It follows that the purpose of the present invention is to provide just such a device, that is, one which may be clipped or similarly harnessed in a handy place, for instance, on the back of the front seat of the automobile.

To the end that the aims under advisement may be aptly carried out, the invention has to do with a rectangular panel of commercial plastics or cloth or appropriate reliable sheet material having spring-attracted hooks at its upper and lower ends for retention purposes and which is provided on its available surface or side with a multiplicity of article-containing pockets.

More specifically, the invention has to do with a pocket-equipped cloth or equivalent panel having hems with springs therein and wherein the springs are attached to upper and lower pairs of hooks, the hooks being engageable with existing parts of the automobile seat to thus provide handy and adequate support for said panel.

Other objects, features and advantages will become more readily apparent from the following description and the accompanying sheet of illustrative drawings.

In the drawings, wherein like numerals are employed to designate like parts throughout the same:

Figure 1 is a fragmentary perspective view of an automobile seat showing the improved attachment, its manner or construction and use;

Figure 2 is a perspective view of the attachment per se;

Figure 3 is a fragmentary section on an enlarged scale taken on the plane of the line 3—3 of Figure 2 looking in the direction of the arrows;

Figure 4 is a similar view with parts in elevation, taken on the vertical line 4—4 of Figure 2 looking in the direction of the arrows; and Figure 5 is an exaggerated section on the horizontal line 5—5 of Figure 1 looking in the direction of the arrows.

Referring now to the drawings with the aid of reference numerals and lead lines, the front seat in the automobile (not detailed) is denoted by the numeral 6. The curvate top of the upholstery is denoted at 8, the bottom or basal portion at 10 and the so-called rearwardly facing side at 12. It is to this side that the improved attachment is connected.

Considered as a ready-to-use unit or attachment, the invention is denoted by the numeral 14. More specifically, it comprises a substantially rectangular panel 16 which is a support member and also a backing member. It may be of canvas, tough cloth or equivalent material and in many instances it will be of commercial plastics of an appropriate grade. It will be of the approximate area shown so that it will reach from the upper to the lower portions of the surface or side 12 of the seat. It is intended to lie substantially flat and taut against the surface 12. The vertical or longitudinal edges are formed with open ended hems 18. These are along both sides and the hems serve to accommodate the attaching devices. Each set or assembly of devices comprises hooks and spring means. More specifically, there is a coil spring 20 in each hem and the shank 22 of the upper J-shaped hook 24 is connected to the spring. There is a similar L-shaped hook at the bottom and the shank 26 is connected to the spring and the bill or hook portion 28 extends in the same direction as the hook 24, as shown. The two upper hooks 24 and 24 are hung or suspended over the curvate surface 8 of the upholstery. The hooks 28 and 28 are engaged with the bottom frame portion of the seat as shown, for example, in Figure 1 of the drawings. This provides ready attachment, detachment and retention of the panel as illustrated. On the usable surface of the panel are the pockets. Any number of pockets will be provided. For example, there is a central vertical elongated pocket 30 for maps and a pouch-like pocket 32 for tissues, and the like. This particular pocket has a zipper fastener as at 34. There are other pockets 36 for slippers, one for glasses, as at 38, and so on. The main pockets, however, are of the open-mouth type and each pocket is preferably provided along its vertical edges with an expansible pleat 40 as best shown in Figure 5. The pleats are stitched in place as at 42. Thus, the pockets may be handily expanded to accommodate the items or articles which are lodged temporarily therein. All of the pockets will be provided with legends or other descriptive notations for handy use. To this end, it is believed that the illustration given in Figure 1 of the drawings is substantially self-explanatory.

It will be clear that the invention has to do with a subject matter of invention which is simple, practical and economical. The finished article constitutes that in which manufacturers, retailers and users will find their respective requirements and needs aptly taken into account and satisfactorily met.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A readily applicable and removable article-holding attachment for automobile seats comprising a flexible inelastic sheet material panel adapted to be tautly stretched and applied against a substantially flat vertical surface of an automobile seat, a plurality of systematically arranged accessible pockets mounted on one side of said panel and adapted to contain miscellaneous articles such as maps, medicines, eyeglasses, and so on, said panel being provided along its respective vertical edges with hems, said hems being open at their upper and lower ends, a coil spring confined lengthwise in the intermediate portion of each hem, an upper hook having a shank sliding in the upper end portion of the hem and connected to the upper end of the coil spring, a lower hook having a shank extending slidably into the lower end of said hem and connected to the lower end of said spring, there being a pair of upper hooks and a pair of lower hooks the latter being adapted to be detachably connected with predetermined upper and lower portions of said automobile seat.

2. A readily applicable and removable article-holding attachment for the rearwardly facing side of the back structure of an automobile seat comprising a flexible but inelastic sheet material panel, substantially rectangular in form and adapted to be stretched tautly and thus applied in a somewhat vertical position against an approximately flat vertical surface of said automobile seat, a plurality of systematically arranged accessible pockets mounted on one side of said panel and adapted to contain miscellaneous articles such as maps, magazines, medicines, eyeglasses, and so on, said panel being provided along its respective vertical edges with hems, said hems being open at their respective upper and lower ends, a pair of upper attaching and retaining hooks adapted to engage removably over and to be hung from the upper edge portion of said automobile seat, a pair of complemental lower hooks adapted to be interposed between the floor of the automobile and the lower basal portion of the seat and to in this manner maintain themselves in position, the respective hooks having shanks, the shanks of the upper hooks telescoping into the upper end portions of the respective hems, the shanks of the lower hooks telescoping and extending upwardly into the lower end portions of said hems, and an elongate coil spring confined in the central portion of each hem and connecting the adjacent and cooperating shanks of the respective upper and lower hooks together.

References Cited in the file of this patent

UNITED STATES PATENTS

| | | |
|---|---|---|
| 736,242 | Gable | Aug. 11, 1903 |
| 2,483,043 | Golden | Sept. 27, 1949 |
| 2,507,842 | Waddill | May 16, 1950 |
| 2,532,517 | Schwartzman et al. | Dec. 5, 1950 |